United States Patent
Hasan et al.

(10) Patent No.: US 7,536,448 B2
(45) Date of Patent: May 19, 2009

(54) AUTO-GENERATION OF CONFIGURATION AND TOPOLOGY MODELS

(75) Inventors: Masum Hasan, Cupertino, CA (US); Andrew G. Harvey, Pleasanton, CA (US); Leo Pereira, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 882 days.

(21) Appl. No.: 10/932,976

(22) Filed: Sep. 2, 2004

(65) Prior Publication Data

US 2006/0045028 A1   Mar. 2, 2006

(51) Int. Cl.
  *G06F 15/177* (2006.01)
  *G06F 9/455* (2006.01)
  *G06F 17/50* (2006.01)
  *G06G 7/62* (2006.01)
  *H04L 29/06* (2006.01)

(52) U.S. Cl. .................. 709/220; 370/256
(58) Field of Classification Search .......... 709/220; 370/256

See application file for complete search history.

(56) References Cited

U.S. PATENT DOCUMENTS

| | | | | |
|---|---|---|---|---|
| 5,911,074 A * | 6/1999 | Leprince et al. | ........... | 717/100 |
| 7,032,014 B2 * | 4/2006 | Thiyagarajan et al. | ...... | 709/220 |
| 7,082,102 B1 * | 7/2006 | Wright | ........... | 370/229 |
| 7,177,924 B2 * | 2/2007 | Murray et al. | ........... | 709/223 |
| 7,210,120 B2 * | 4/2007 | Reyna | ........... | 717/106 |
| 7,213,026 B2 * | 5/2007 | Evans et al. | ........... | 707/101 |
| 7,239,629 B1 * | 7/2007 | Olshansky et al. | ........... | 370/353 |
| 7,240,303 B1 * | 7/2007 | Schubert et al. | ........... | 716/4 |
| 2003/0046370 A1 * | 3/2003 | Courtney | ........... | 709/220 |
| 2003/0056193 A1 * | 3/2003 | Perycz et al. | ........... | 717/107 |
| 2003/0115299 A1 * | 6/2003 | Froyd et al. | ........... | 709/220 |
| 2003/0115305 A1 * | 6/2003 | Murray et al. | ........... | 709/222 |
| 2003/0204619 A1 * | 10/2003 | Bays | ........... | 709/238 |
| 2004/0117452 A1 * | 6/2004 | Lee et al. | ........... | 709/208 |
| 2005/0021684 A1 * | 1/2005 | Hsue et al. | ........... | 709/220 |
| 2006/0012393 A1 * | 1/2006 | Raju Datla et al. | ........... | 326/39 |

OTHER PUBLICATIONS

Cisco Systems, Inc., "IOS CLI Processing using Standard Parsing Technology and Formalization of CLI Specification", by Masum Z. Hasan, Copyright © 2003, 32 pages.

* cited by examiner

*Primary Examiner*—William C Vaughn, Jr.
*Assistant Examiner*—Muktesh G Gupta
(74) *Attorney, Agent, or Firm*—Trellis IP Law Group, PC

(57) ABSTRACT

Systems and methods are provided for generating an Internetworking Operating System (IOS) Command Line Interface (CLI) configuration model and a logical topology from an IOS CLI configuration base. The method includes representing structure and cross-CLI dependencies in a formal specification format, such as Extended Backus-Naur Form (EBNF), and translating the representation into a machine-processable structure and code referred to as the IOS CLI Dependency Tree (ICDT). The ICDT is the configuration model. The ICDT optionally may be manipulated to generate configuration models in other formats, such as Java classes or XSD (eXtensible markup language Schema Definition). The method further includes generating the logical topology from the ICDT.

21 Claims, 7 Drawing Sheets

504

```
interface atm 1/0
 atm pvp 1 l2transport
  encapsulation aal0 ! cell relay
  xconnect 10.10.1.3 555 pwclass
   pvp1
   service-policy input CBR1
   service-policy output P4
   cbr 1000 ! egress ATM shaping
```

508

```
class-map match-any PLATINUM
  match ip prec 5
class-map match-any GOLD
  match ip prec 1 2 3 4 policy-map P4
 class PLATINUM
 !! Priority Queue
   priority 100
 class GOLD
   bandwidth remaining \
    percent 70
```

502

```
pseudowireclass pvp1
 encapsulation mpls
 preferred-path interface Tunnel10 \
  disable-fallback
```

506

```
interface Tunnel 10
 description PE2-PE4-Primary
 ip unnumbered Loopback0
 no ip directed-broadcast
 tunnel destination 10.10.1.2
 tunnel mode mpls traffic-eng
 tunnel mpls traffic-eng autoroute \
  announce
 tunnel mpls traffic-eng priority 3 3
 tunnel mpls traffic-eng bandwidth \
  sub-pool 1000
 tunnel mpls traffic-eng path-option \
  1 \ explicit name PE2-PE4-
  Primary
 tunnel mpls traffic-eng record-route
 tunnel mpls traffic-eng fast-reroute
```

FIG. 5

AUTO-GENERATION OF CONFIGURATION AND TOPOLOGY MODELS

BACKGROUND OF THE INVENTION

1. Field of Invention

The present invention relates in general to the field of network and device configuration management. More specifically, embodiments of the present invention relate to systems and methods for auto-generation of configuration and logical topology models from an Internetworking Operating System (IOS) Command Line Interface (CLI) configuration base.

2. Description of the Background Art

Internetworking Operating System (IOS), such as Cisco's IOS, is a flagship software for control and management of devices, such as Cisco's devices. IOS provides a Command Line Interface (CLI) that is used to configure IOS-based devices.

For proper management of a network, element or network management systems, especially configuration management systems, need to be equipped with configuration and logical topology models. Generally, the process of building such models is manual and laborious. Hence, there is a need for automating the generation of configuration and topology models. Present state-of-the-art does not provide mechanisms for automation, specially, with respect to IOS CLI configuration bases. Since devices (e.g., Cisco devices) are widely used in the networks, as a consequence IOS CLI for configuration of devices, there is a need for automation of configuration and topology model generation.

SUMMARY OF EMBODIMENTS OF THE INVENTION

In an embodiment of the present invention, a method is provided for automatically generating a configuration model from an Internetworking Operating System (IOS) Command Line Interface (CLI) configuration base. The method includes representing structure and cross-CLI dependencies in a formal specification format, such as Extended Backus-Naur Form (EBNF), and translating the representation into a machine-processable structure and code referred to as an IOS CLI Dependency Tree (ICDT). The ICDT is the configuration model, and optionally may be manipulated to generate configuration models in other formats, such as Java classes or XSD (eXtensible markup language Schema Definition).

In another embodiment of the present invention, a method is provided for auto-generating logical topology model from the ICDT. The logical topology is configured implicitly by using IOS CLI. Hence, the ICDT configuration model contains information about logical topology, which may be extracted from the ICDT.

These provisions together with the various ancillary provisions and features which will become apparent to those artisans possessing skill in the art as the following description proceeds are attained by devices, assemblies, systems and methods of embodiments of the present invention, various embodiments thereof being shown with reference to the accompanying drawings, by way of example only, wherein:

BRIEF DESCRIPTION OF THE DRAWINGS

FIG. 5 shows exemplary illustrations of user-defined configurations, in accordance with an exemplary embodiment of the invention.

DETAILED DESCRIPTION OF EMBODIMENTS OF THE INVENTION

Various embodiments of the present invention provide systems and methods for auto-generation of Internetworking Operating System (IOS) Command Line Interface (CLI) model and logical topology from an IOS CLI configuration base.

Figure 1:
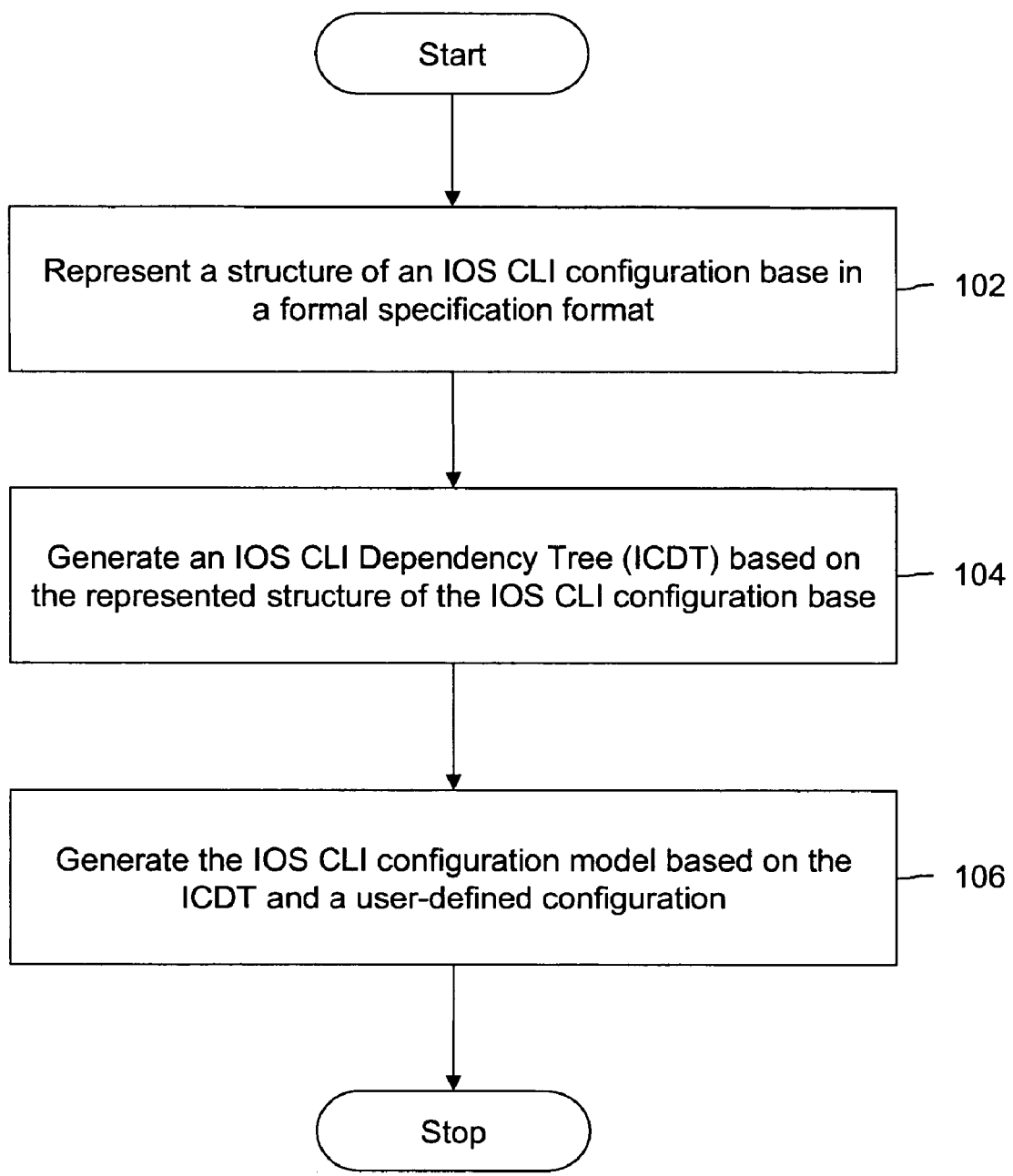
FIG. 1 is a flowchart illustrating a method for generating an Internetworking Operating System (IOS) Command Line Interface (CLI) configuration model, in accordance with an exemplary embodiment of the invention.

FIG. 1 is a flowchart illustrating a method for generating an IOS CLI configuration model, in accordance with an exemplary embodiment of the invention. At step 102, a structure of an IOS CLI configuration base is represented in a formal specification format. This structure is translated into a machine-processable structure referred to as an IOS CLI dependency tree (ICDT). The ICDT is generated based on the represented structure of the IOS CLI configuration base, at step 104. At step 106, the IOS CLI configuration model is generated based on the ICDT and a user-defined configuration.

Figure 2:
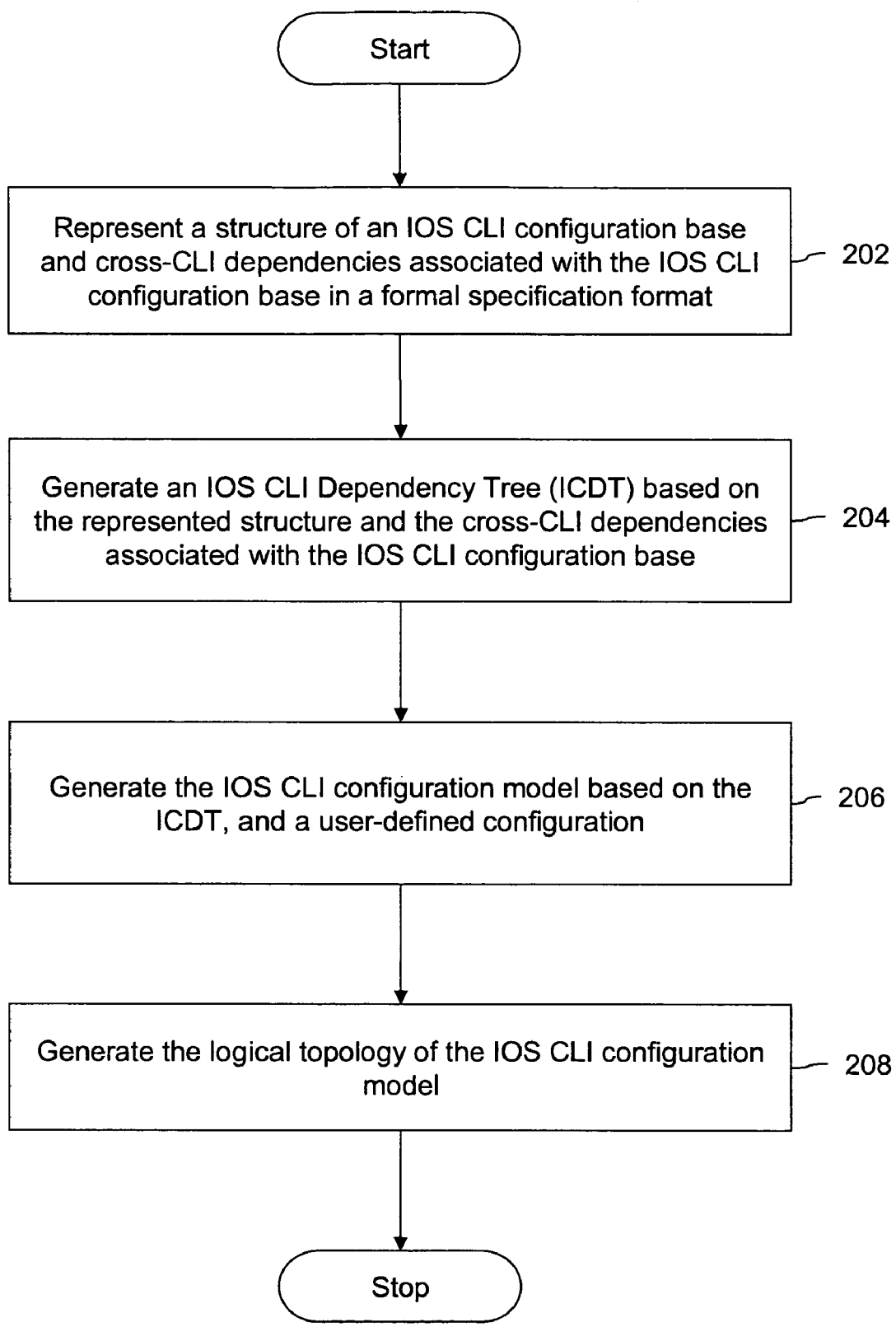
FIG. 2 is a flowchart illustrating a method for generating an IOS CLI configuration model and a logical topology, in accordance with another embodiment of the invention.

FIG. 2 is a flowchart illustrating a method for generating an IOS CLI configuration model and a logical topology, in accordance with another embodiment of the invention. At step 202, a structure of an IOS CLI configuration base and cross-CLI dependencies associated with the IOS CLI configuration base is represented in a formal specification format. The cross-CLI dependencies associated with the IOS CLI configuration base are generally referred to as implicit ordering or sequencing of the components of the IOS CLI configuration base. For example, the IOS may support the containment and reference-type dependencies. The containment dependency may be a mode-submode type of dependency (i.e., interface-subinterface dependency). In the following example of IOS CLI configuration base,

| 'interface | atm | 1/0 |
| atm pvp 1 l2 transport' | | | atm 1/0 and atm pvp 1 CLIs are in containment dependency, wherein atm 1/0 is the interface while atm pvp 1 is the subinterface. Further, in the following example of IOS CLI configuration base,

```
'interface                              atm                                    1/0
    atm                          pvp            1                       l2transport
    xconnect                10.10.01.03        555        pwclass            pvp1
    pseudowire-class                                                         pvp1
        encapsulation                                                         mpls
            preferred-path                   interface   Tunnel10                \
                disable-fallback'
``` component pvp1 pseudowire is defined separately and referred from the xconnect CLI. Therefore, pvp1 pseudowire and xconnect have the reference type dependency. Tunnel10 in the pvp1 pseudowire definition is also an example of the reference type dependency.

At step 204, an ICDT is then generated based on the represented structure of the IOS CLI configuration base, and the represented Cross-CLI dependencies. This is further illustrated in conjunction with FIG. 4. The IOS CLI configuration model is then generated based on the ICDT and a user-defined configuration at step 206. The user-defined configuration may be an IOS configuration inputted by the user on the CLI.

In various embodiments of the invention, the ICDT may be generated in a user-defined format. The IOS CLI configuration model may then be correspondingly generated in the user-defined format, which may be, for example, XML (eXtensible Markup Language), XSD (XML Schema Definition), CIM (Common Information Model), MOF (Meta Object Format), C++ classes, Java classes, and the like. For example, Java/C++ classes may be generated for ICDT representing interface, atm, pvp, and service-policy (MQC quality of service policy). In this case, each of the classes can be augmented with appropriate references: interface to atm to pvp to service-policy. Similarly, the ICDT may be generated in XML. In various embodiments of the invention, the mapping rules that generate the IOS CLI configuration model in the user-defined format are represented at step 202.

At step 208, a logical topology of the IOS CLI configuration model is generated. In various embodiments of the invention, a logical topology may be generated based on the user-defined configuration and the ICDT. The logical topology may be derived by identifying CLI keywords that configure the logical topology. For example, xconnect, destination, tunnel, and pvp, are the CLI keywords that configure the logical topology. A table of the CLI keywords is then constructed. The ICDT may then be traversed down recursively starting from the root. A logical topology node N is created for an element in the table that matches a CLI keyword in the ICDT. The node may contain the CLI keyword and its immediate parameter. For example, the node may contain tunnel 10, pvp 1, or xconnect 555. Thereafter, the node may be connected with any previously created node in the recursion.

In various embodiments of the invention, the CLI keywords are divided based on their level or mode and then a table of the CLI keywords is constructed. For example, atm may be at level 1, pvp may be at level 2, xconnect may be at level 3, tunnel may be at level 1, and tunnel destination may be at level 2.

Figure 3:
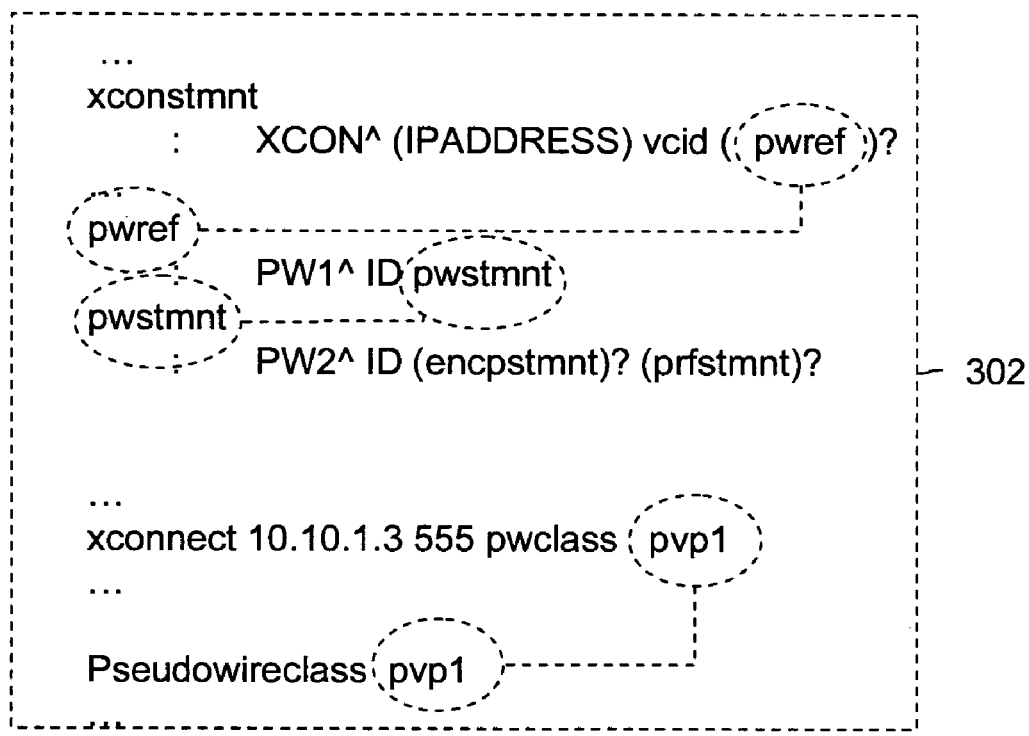
FIG. 3 shows an exemplary illustration of a formal specification format for representing cross-CLI dependencies associated with an IOS CLI configuration base, in accordance with an exemplary embodiment of the invention.

FIG. 3 shows an exemplary illustration of a formal specification format 300 for representing cross-CLI dependencies associated with an IOS CLI configuration base, in accordance with an exemplary embodiment of the invention. Formal specification format 300 includes a represented cross-CLI dependency 302. In formal specification format 300, a word marked as a caret (^) in the representation corresponds to a subgraph root in the corresponding ICDT. Further, if for example, CLI A and B have a dependency, then the representation of A refers to the representation of B via a common reference. For example, in formal specification format 300 pwref is a common reference.

Figure 4:
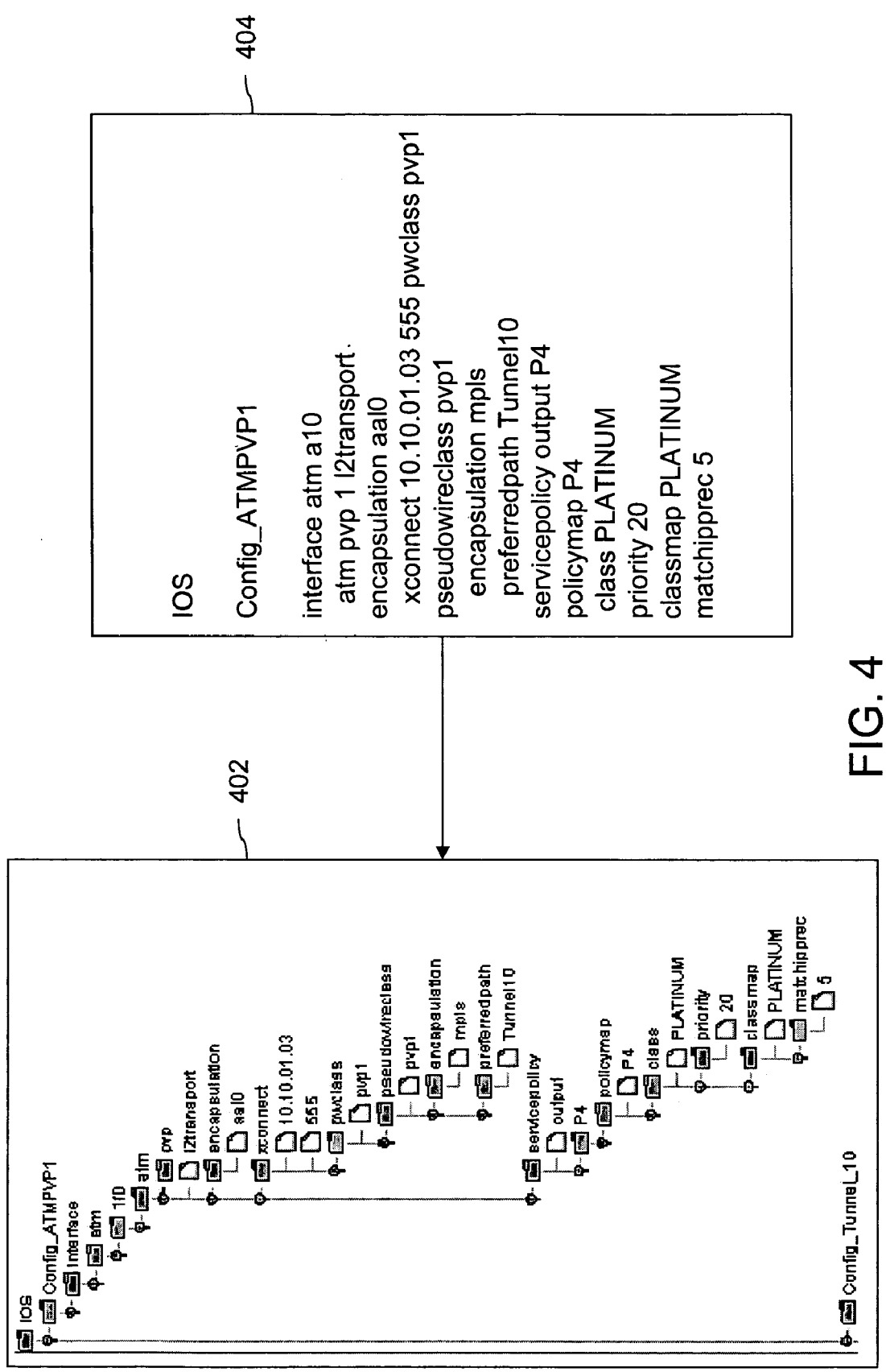
FIG. 4 shows an exemplary illustration of an IOS CLI Dependency Tree (ICDT), in accordance with an exemplary embodiment of the invention.

FIG. 4 shows an exemplary illustration of an ICDT 402 that is generated based on represented structure and cross-CLI dependencies associated with an IOS CLI configuration base and a user-defined configuration 404, in accordance with an exemplary embodiment of the invention. ICDT 402 is a dependency graph. For example, component atm includes four dependent components pvp, encapsulation, xconnect, and service policy. The IOS CLI configuration base, based on which ICDT 402 is generated, includes a Private Virtual Path (PVP)' logical connection pvp1 on an Asynchronous Transfer Mode (ATM) interface atm 1/0 of a router PE2. The IOS CLI configuration base further includes a PseudoWire logical connection pw 555 associated with pvp 1, a Multi-Protocol Label Switching (MPLS) Traffic Engineering TE, a tunnel logical connection Tunnel 10 between two routers PE2 and PE3 and a Quality of Service (QoS) configuration P4 on the ATM interface. This may be further illustrated in conjunction with FIG. 6.

FIG. 5 shows exemplary illustrations of user-defined configurations 502, 504, 506, and 508, which may be inputted by the user on the CLI for the IOS CLI configuration base illustrated in conjunction with FIG. 4, in accordance with an exemplary embodiment of the invention. User-defined configurations 502, 504, 506, and 508 may be employed further to illustrate logical topology in FIG. 6.

Figure 6:
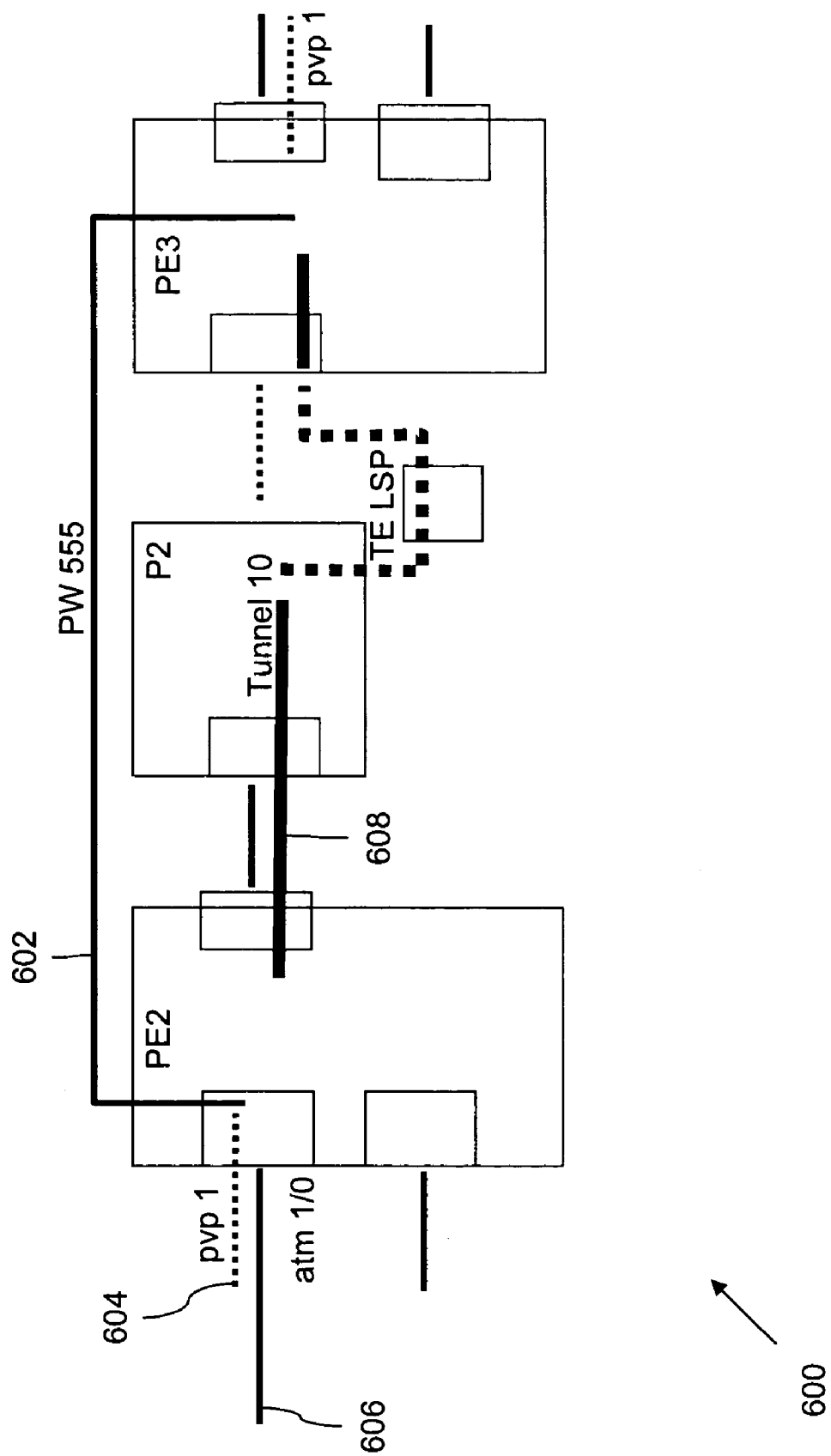
FIG. 6 shows an exemplary illustration of a logical topology based on the user-defined configurations illustrated in conjunction with FIG. 5, in accordance with an exemplary embodiment of the invention.

FIG. 6 shows an exemplary illustration 600 of logical topology based on the ICDT corresponding to the IOS CLI configuration base explained in conjunction with FIG. 4 and user-defined configurations 502, 504, 506 and 508, explained in conjunction with FIG. 5. A logical topology 602 is generated corresponding to user-defined configuration 502. Further, a logical topology 604 and a logical topology 606 are generated corresponding to user-defined configuration 504. Logical topology 606 may also be generated corresponding to user-defined configuration 508. Similarly, a logical topology 608 is generated corresponding to user-defined configuration 506. Further, the logical topology shown in exemplary illustration 600 is implicit in user-defined configurations 502, 504, 506 and 508. The logical topology, in exemplary illustration 600, may be summarized as: PVP pvp 1 is associated with interface atm 1/0; PW 555 logical connection is associated with pvp 1; the other end point of PW 555 logical connection is 10.10.1.3; and the other end point of Tunnel 10 MPLS TE logical connection is 10.10.1.2.

Figure 7:
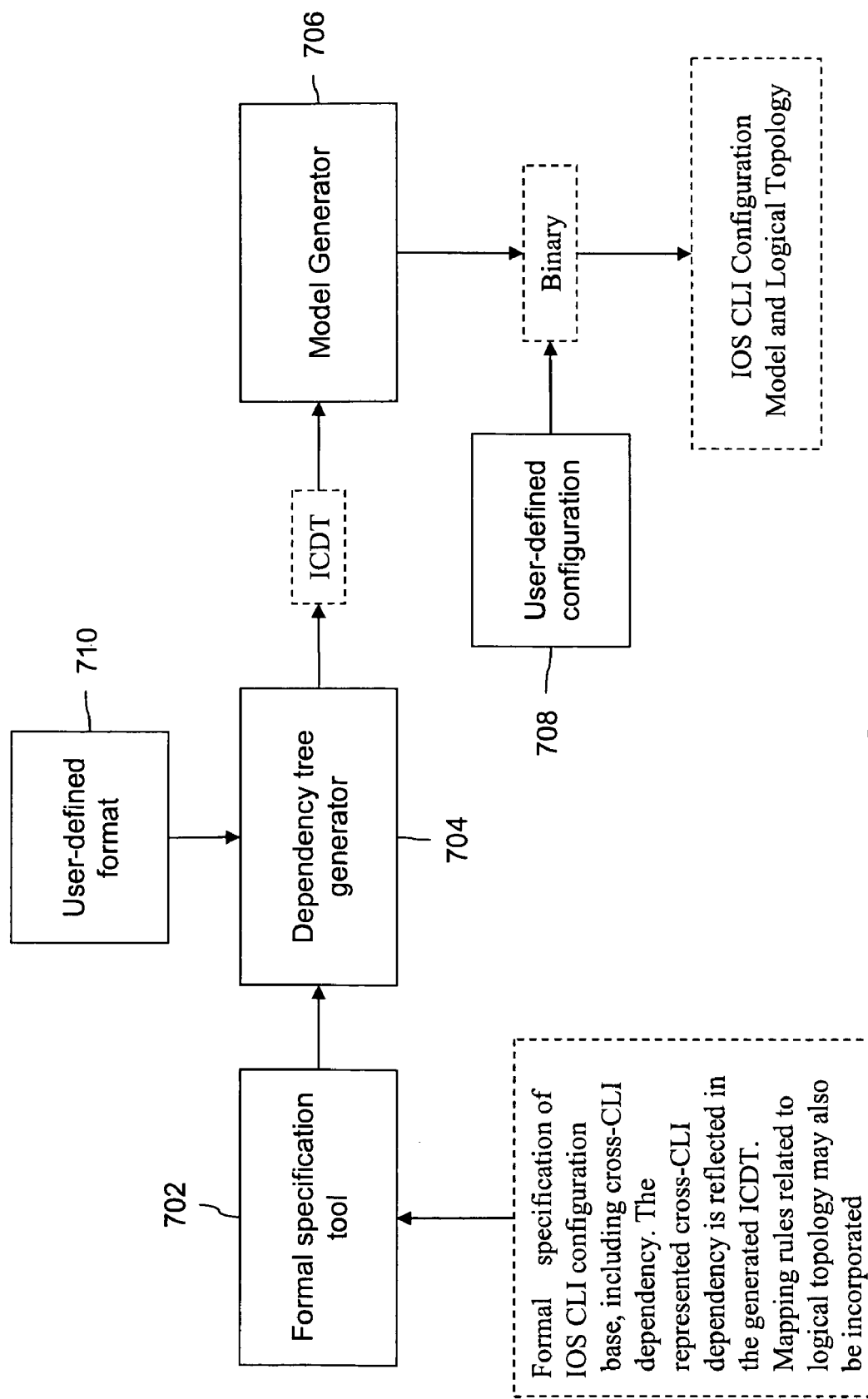
FIG. 7 is a block diagram of a system for generating an IOS CLI configuration model and a logical topology, in accordance with an exemplary embodiment of the invention.

FIG. 7 is a block diagram of a system 700 for generating an IOS CLI configuration model and a logical topology, in accordance with an exemplary embodiment of the invention. System 700 includes a formal specification tool 702, a dependency tree generator 704, and a model generator 706.

Formal specification tool 702 is used to represent a structure of an IOS CLI configuration model in a formal specification format. Further, formal specification tool 702 is used to represent cross-CLI dependencies associated with the IOS CLI configuration base in the formal specification format. In various embodiments of the invention, formal specification tool 702 may be Back-Naur Form (BNF) or Extended-BNF (EBNF). Dependency tree generator 704 generates the ICDT based on the represented structure of the IOS CLI configuration base. In various embodiments of the invention, dependency tree generator 704 may generate the ICDT based on the represented structure and the cross-CLI dependencies associated with the IOS CLI configuration base. In further various embodiments of the invention, dependency tree generator 704 generates the ICDT by using parser generators, such as Lex/Yacc-type LL(K) parser generator.

Model generator 706 generates the IOS CLI configuration model based on the ICDT and a user-defined configuration 708. In various embodiments of the invention, dependency tree generator 704 may generate the ICDT in a user-defined format 710. Model generator 706 then correspondingly, generates the IOS CLI configuration model in user-defined format 710. User-defined format 710 may be for example, XML (eXtensible Markup Language), XSD (XML Schema Definition), CIM (Common Information Model), MOF (Meta Object Format), C++ classes, Java classes, and the like.

In various embodiments of the invention, model generator 706 may further generate a logical topology of the IOS CLI configuration model. In various embodiments of the invention, model generator 706 generates a logical topology based on user-defined configuration 708 and the ICDT. In various embodiments of the invention, model generator 706 generates the logical topology of the IOS CLI configuration model by identifying CLI keywords that configure the logical topology. For example, xconnect, destination, tunnel, and pvp, are the CLI keywords that configure the logical topology. A table of the CLI keywords is then constructed by model generator 706. The ICDT may then be traversed down recursively starting from the root by model generator 706. A logical topology node N is then created by model generator 706, for an element in the table that matches a CLI keyword in the ICDT.

In various embodiments of the invention, model generator 706 compiles the code corresponding to ICDT into a binary format and generates the IOS CLI configuration base model and the logical topology based on user-defined configuration 708.

In various embodiments of the invention, formal specification tool 702 is further used to represent mapping rules in the formal specification format to generate the ICDT in user-defined format 712. Model generator 706 uses these mapping rules to generate the IOS CLI configuration model in user-defined format 710. In various embodiments of the invention, formal specification tool 702 is further used to represent mapping rules in the formal specification format for generation of logical topology. Model generator 706 uses these mapping rules to generate the logical topology.

In various embodiments of the invention, formal specification of the IOS CLI configuration base, including cross-CLI dependency is inputted to formal specification tool 702. Dependency tree generator 704 generates the ICDT based on the input formal specification to formal specification tool 702. In various embodiments of the invention, dependency tree generated 704 may generate the ICDT in user-defined format 710, by using the formal specification of mapping rules. Model generator 706 may compile the code, based on the generated ICDT, to binary. The binary generated IOS CLI configuration model and the logical topology are based on user-defined configuration 708.

The various embodiments of the invention provide systems and methods that enable auto-generation of IOS CLI configuration models and logical topology from an IOS CLI configuration base.

Although the invention has been discussed with respect to specific embodiments thereof, these embodiments are merely illustrative, and not restrictive, of the invention. Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system,apparatus, system or device. The computer readable medium can be, by way of example only but not by limitation, a semiconductor system, apparatus, system, device, or computer memory.

A "processor" or "process" includes hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, quantum or nanoengineered systems, components and mechanisms may be used. In general, the functions of the present invention can be achieved by any means as is known in the art. Distributed or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for generating an Internetworking Operating System (IOS) Command Line Interface (CLI) configuration model using a processor, the processor executing the following method:

representing a structure of an IOS CLI configuration base in a formal specification format, the IOS CLI configuration base providing cross-CLI dependencies that specify an ordering of components in the IOS CLI configuration base;

representing mapping rules in the formal specification format for mapping the represented structure of the IOS CLI configuration base to a user-defined format;

receiving an IOS user-defined configuration that is input by a user on the CLI for the IOS CLI configuration base;

generating a machine-readable IOS CLI Dependency Tree (ICDT) from the represented structure of the IOS CLI configuration base, the ICDT being a dependency graph representing the components and the ordering of the cross-CLI dependencies, the ICDT being generated in the user-defined format using the represented mapping rules; and automatically generating a logical topology of the IOS CLI configuration model from the machine-readable ICDT and the IOS user-defined configuration by traversing the dependency graph to determine components in the dependency graph that are usable to configure the logical topology, wherein a logical connection between the determined components is based on the ordering in the dependency graph, the IOS CLI configuration model displaying the logical topology in the IOS user-defined configuration based on the mapping rules.

2. The method in accordance with claim 1, wherein the formal specification format comprises Extended Backus-Naur Form (EBNF).

3. The method in accordance with claim 1, wherein the IOS CLI configuration base comprises a Private Virtual Path (PVP) logical connection on an Asynchronous Transfer Mode (ATM) interface.

4. The method in accordance with claim 3, wherein the IOS CLI configuration base comprises a PseudoWire logical connection associated with the PVP logical connection.

5. The method in accordance with claim 1, wherein the IOS CLI configuration base comprises a Multi-Protocol Label Switching (MPLS) Traffic Engineering logical connection.

6. The method in accordance with claim 1, wherein a word in the represented structure is marked with a caret to indicate a correspondence to a subgraph root in the ICDT.

7. The method in accordance with claim 3, wherein the IOS CLI configuration base comprises a Quality of Service (QoS) configuration on the ATM interface.

8. The method of claim 1,
wherein the automatically generating the logical topology of the IOS CLI configuration model comprises compiling code corresponding to the ICDT.

9. The method in accordance with claim 1, wherein the user-defined format comprises eXtensible Markup Language (XML).

10. The method in accordance with claim 1, wherein the user-defined format comprises XML Schema Definition (XSD).

11. The method in accordance with claim 1, wherein the formal specification format comprises Common Information Model (CIM).

12. A system for generating an Internetworking Operating System IOS Command Line Interface (CLI) configuration model using a processor, the system comprising:

a formal specification tool for representing a structure of an IOS CLI configuration base in a formal specification format, the IOS CLI configuration base providing cross-CLI dependencies that specify an ordering of components in the IOS CLI configuration base, the formal specification tool being further for representing mapping rules in the formal specification format for mapping the represented structure of the IOS CLI configuration base to a user-defined format;

a receiver for receiving an IOS user-defined configuration that is input by a user on the CLI for the IOS CLI configuration base;

a dependency tree generator for generating a machine-readable IOS CLI Dependency Tree (ICDT) from the represented structure of the IOS CLI configuration base, the ICDT being a dependency graph representing the components and the ordering of the cross-CLI dependencies, the ICDT being generated in the user-defined format using the represented mapping rules; and a compiler for automatically generating a logical topology of the IOS CLI configuration model from the machine-readable ICDT and the IOS user-defined configuration by traversing the dependency graph to determine components in the dependency graph that are usable to configure the logical topology, wherein a logical connection between the determined components is based on the ordering in the dependency graph, the IOS CLI configuration model displaying the logical topology in the IOS user-defined configuration based on the mapping rules.

13. The system in accordance with claim 12, wherein the formal specification format comprises Extended Backus-Naur Form (EBNF).

14. The system in accordance with claim 12, wherein the formal specification format comprises Backus-Naur Form (BNF).

15. The system in accordance with claim 12, wherein the IOS CLI configuration base comprises a Private Virtual Path (PVP) logical connection on an Asynchronous Transfer Mode (ATM) interface.

16. The system in accordance with claim 12, wherein the IOS CLI configuration base comprises a PseudoWire logical connection associated with the PVP logical connection.

17. The system in accordance with claim 12, wherein the user-defined format comprises eXtensible Markup Language (XML).

18. The system in accordance with claim 14, wherein the user-defined format comprises C++ classes.

19. A system for generating an Internetworking Operating System (IOS) Command Line Interface (CLI) configuration model, the system comprising:

a processor;

a computer-readable storage device including instructions executable by the processor, the storage device comprising:

one or more instructions for representing a structure of an IOS CLI configuration base in a formal specification format, the IOS CLI configuration base providing cross-CLI dependencies that specify an ordering of components in the IOS CLI configuration base;

one or more instructions representing mapping rules in the formal specification format for mapping the represented structure of the IOS CLI configuration base to a user-defined format;

one or more instructions receiving an IOS user-defined configuration that is input by a user on the CLI for the IOS CLI configuration base;

one or more instructions for generating a machine-readable IOS CLI Dependency Tree (ICDT) from the represented structure of the IOS CLI configuration base, the ICDT being a dependency graph representing the components and the ordering of the cross-CLI dependencies, the ICDT being generated in the user-defined format using the represented mapping rules; and one or more instructions for automatically generating a logical topology of the IOS CLI configuration model from the machine-readable ICDT and the IOS user-defined configuration by traversing the dependency graph to determine components in the dependency graph that are usable to configure the logical topology, wherein a logical connection between the determined components is based on the ordering in the dependency graph, the IOS CLI configuration model displaying the logical topology in the IOS user-defined configuration based on the mapping rules.

20. A computer-readable storage device including instructions executable by a processor, the storage device comprising:

one or more instructions for representing a structure of an Internetworking Operating System (IOS) Command Line Interface (CLI) configuration base in a formal specification format, the IOS CLI configuration base providing cross-CLI dependencies that specify an ordering of components in the IOS CLI configuration base;

one or more instructions representing mapping rules in the formal specification format for mapping the represented structure of the IOS CLI configuration base to a user-defined format;

one or more instructions receiving an IOS user-defined configuration that is input by a user on the CLI for the IOS CLI configuration base;

one or more instructions for generating a machine-readable IOS CLI Dependency Tree (ICDT) from the represented structure of the IOS CLI configuration base, the ICDT being a dependency graph representing the components and the ordering of the cross-CLI dependencies, the ICDT being generated in the user-defined format using the represented mapping rules; and one or more instructions for automatically generating a logical topology of an IOS CLI configuration model from the machine-readable ICDT and the IOS user-defined configuration by traversing the dependency graph to determine components in the dependency graph that are usable to configure the logical topology, wherein a logical connection between the determined components is based on the ordering in the dependency graph, the IOS CLI configuration model displaying the logical topology in the IOS user-defined configuration based on the mapping rules.

21. A system for generating an Internetworking Operating System (IOS) Command Line Interface (CLI) configuration model using a processor, the system comprising:

means for representing a structure of an IOS CLI configuration base in a formal specification format, the IOS CLI configuration base providing cross-CLI dependencies that specify an ordering of components in the IOS CLI configuration base;

means for representing mapping rules in the formal specification format for mapping the represented structure of the IOS CLI configuration base to a user-defined format;

means for receiving an IOS user-defined configuration that is input by a user on the CLI for the IOS CLI configuration base;

means for generating a machine-readable IOS CLI Dependency Tree (ICDT) from the represented structure of the IOS CLI configuration base, the ICDT being a dependency graph representing the components and the ordering of the cross-CLI dependencies, the ICDT being generated in the user-defined format using the represented mapping rules; and means for automatically generating a logical topology of the IOS CLI configuration model from the machine-readable ICDT and the IOS user-defined configuration by traversing the dependency graph to determine components in the dependency graph that are usable to configure the logical topology, wherein a logical connection between the determined components is based on the ordering in the dependency graph, the IOS CLI configuration model displaying the logical topology in the IOS user-defined configuration based on the mapping rules.

* * * * *